United States Patent
Ikejima

(10) Patent No.: US 9,286,479 B2
(45) Date of Patent: Mar. 15, 2016

(54) INFORMATION MANAGEMENT SYSTEM AND INFORMATION MANAGEMENT METHOD

(71) Applicant: KYOCERA DOCUMENT SOLUTIONS INC., Osaka (JP)

(72) Inventor: Ayaka Ikejima, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/302,707

(22) Filed: Jun. 12, 2014

(65) Prior Publication Data

US 2014/0380507 A1 Dec. 25, 2014

(30) Foreign Application Priority Data

Jun. 24, 2013 (JP) ................................ 2013-131996

(51) Int. Cl.
*G06F 21/10* (2013.01)
*G06F 21/60* (2013.01)

(52) U.S. Cl.
CPC .................................... *G06F 21/608* (2013.01)

(58) Field of Classification Search
CPC ....................................................... G06F 21/10
See application file for complete search history.

(56) References Cited

U.S. PATENT DOCUMENTS

| 8,201,224 | B1 * | 6/2012 | Spertus | 726/4 |
| 8,266,705 | B2 * | 9/2012 | Hikichi | 726/26 |
| 8,336,096 | B2 * | 12/2012 | Narusawa et al. | 726/19 |
| 2005/0097171 | A1 | 5/2005 | Hikichi | |
| 2008/0104391 | A1 * | 5/2008 | Fukuta | H04L 63/0272 713/153 |
| 2012/0079604 | A1 | 3/2012 | Hikichi | |

FOREIGN PATENT DOCUMENTS

| JP | 2005-158038 A | 6/2005 |
| JP | 2007-179155 A | 7/2007 |
| JP | 2011-198064 A | 10/2011 |

OTHER PUBLICATIONS

Ricoh Americas Corporation, Ricoh Aficio Common Security Features Guide, 2008, Version 9.*
An Office Action; "Notice of Reasons for Rejection," issued by the Japanese Patent Office on Sep. 1, 2015, which corresponds to Japanese Patent Application No. 2013-131996 and is related to U.S. Appl. No. 14/302,707.

* cited by examiner

Primary Examiner — Kambiz Zand
Assistant Examiner — Thanh Le
(74) Attorney, Agent, or Firm — Studebaker & Brackett PC

(57) ABSTRACT

An information management system includes a registration information storing section, a permission information receiving section, and a registration information management section. The registration information storing section stores registration information for which a first user has a usage right. The permission information receiving section receives, from a second user not having the usage right for the registration information, input of usage permission information that is notified from the first user to the second user and for temporarily permitting the second user to check the existence of the registration information and to use the registration information. Based on the usage permission information, the registration information management section enables the second user to check the existence of the registration information and to use the registration information.

6 Claims, 4 Drawing Sheets

INFORMATION MANAGEMENT SYSTEM AND INFORMATION MANAGEMENT METHOD

INCORPORATION BY REFERENCE

The present application claims priority under 35 U.S.C. §119 to Japanese Patent Application No. 2013-131996, filed Jun. 24, 2013. The contents of this application are incorporated herein by reference in their entirety.

BACKGROUND

The present disclosure relates to an information management system and an information management method for managing information for which a usage right is set.

For example, some image forming apparatus has a box function of storing image data of a document, for example, that is read by a scanner or the like into a storage area, within the memory, called a document box. The image forming apparatus is a digital multifunction peripheral, for example. The image forming apparatus having the box function allows users to use image data (box document) stored in the document box as needed. For example, with the use of the box function, the user is allowed to transmit a box document by e-mail or facsimile to a desired destination.

The image forming apparatus stores in advance an address book in which destination information (registration information) including a destination name and a corresponding destination identifier, such as an e-mail address, is registered. This allows the user to smoothly specify the destination when transmitting a box document. Such an address book is personal information. Therefore, it is common to set a usage right for registration information so as to permit use of the registration information only to the user who registered the registration information (registered user) and to users belonging to the same department as the registered user.

Setting the usage right for registration information can reduce leakage of the registration information. On the other hand, however, the convenience in using the address book is reduced. For example, there may be a case where a registered user is out of the office and requests a user who is in the office to transmit a box document. Yet, if the user who received the request does not have the usage right for the box document, he or she cannot transmit the box document and may not be able to act on the request.

In view of this, a technology is disclosed according to which use of destination information that requires a usage right is temporarily permitted to a user not having the usage right by inputting an access code.

With this technology, however, the destination name in the destination information requiring the usage right can be freely checked even before the access code is input. Therefore, there is a risk of leakage of the destination name.

SUMMARY

An information management system according to an aspect of the present disclosure includes a registration information storing section, a permission information receiving section, and a registration information management section. The registration information storing section stores registration information for which a first user has a usage right to check existence of the registration information and to use the registration information. The permission information receiving section receives, from a second user not having the usage right for the registration information, input of usage permission information that is notified from the first user to the second user and for temporarily permitting the second user to check the existence of the registration information and to use the registration information. Based on the usage permission information received by the permission information receiving section from the second user, the registration information management section enables the second user to check the existence of the registration information and to use the registration information.

An information management method according to another aspect of the present disclosure involves: (i) storing registration information for which a first user has a usage right to check existence of the registration information and to use the registration information; (ii) receiving, from a second user not having the usage right for the registration information, input of usage permission information that is notified from the first user to the second user and for temporarily permitting the second user to check the existence of the registration information and to use the registration information; and (iii) enabling, based on the usage permission information received from the second user, the second user to check the existence of the registration information and to use the registration information.

A non-transitory computer readable recording medium according to a yet another aspect of the present disclosure stores an information management program executable by a computer. The information management program includes a first program code, a second program code, and a third program code. The first program code causes the computer to store registration information for which a first user has a usage right to check existence of the registration information and to use the registration information. The second program code causes the computer to receive, from a second user not having the usage right for the registration information, input of usage permission information that is notified from the first user to the second user and for temporarily permitting the second user to check the existence of the registration information and to use the registration information. The third program code causes the computer to enable, based on the usage permission information received from the second user, the second user to check the existence of the registration information and to use the registration information.

DETAILED DESCRIPTION

Usage permission information is employed to temporarily permit a user not having a usage right for registration information to check the existence of the registration information and to use the registration information, while the registration information is protected from leakage. Based on the usage permission information notified from a first user having the usage right to a second user not having the usage right, an information management system temporarily permits the second user to check the existence of the registration information and to use the registration information.

Although not particularly limited, the information management system is applicable to the address book management of an image forming apparatus. In this case, the registration information is destination information registered in an address book or image data registered in a document box (box document), for example. The destination information includes a destination name and a destination identifier. In the case where the registration information is destination information, to check the existence of the registration information means to check whether or not a desired piece of destination information is registered in the address book. In the case where the registration information is a box document, to check the existence of the registration information means to check whether or not a desired box document is registered in the document box. To enable the existence of the registration information to be checked, the information management system displays, based on the usage permission information, the destination information on the image forming apparatus with the destination identifier hidden.

The following now describes an embodiment of the present disclosure with reference to the accompanying drawings.

Figure 1:
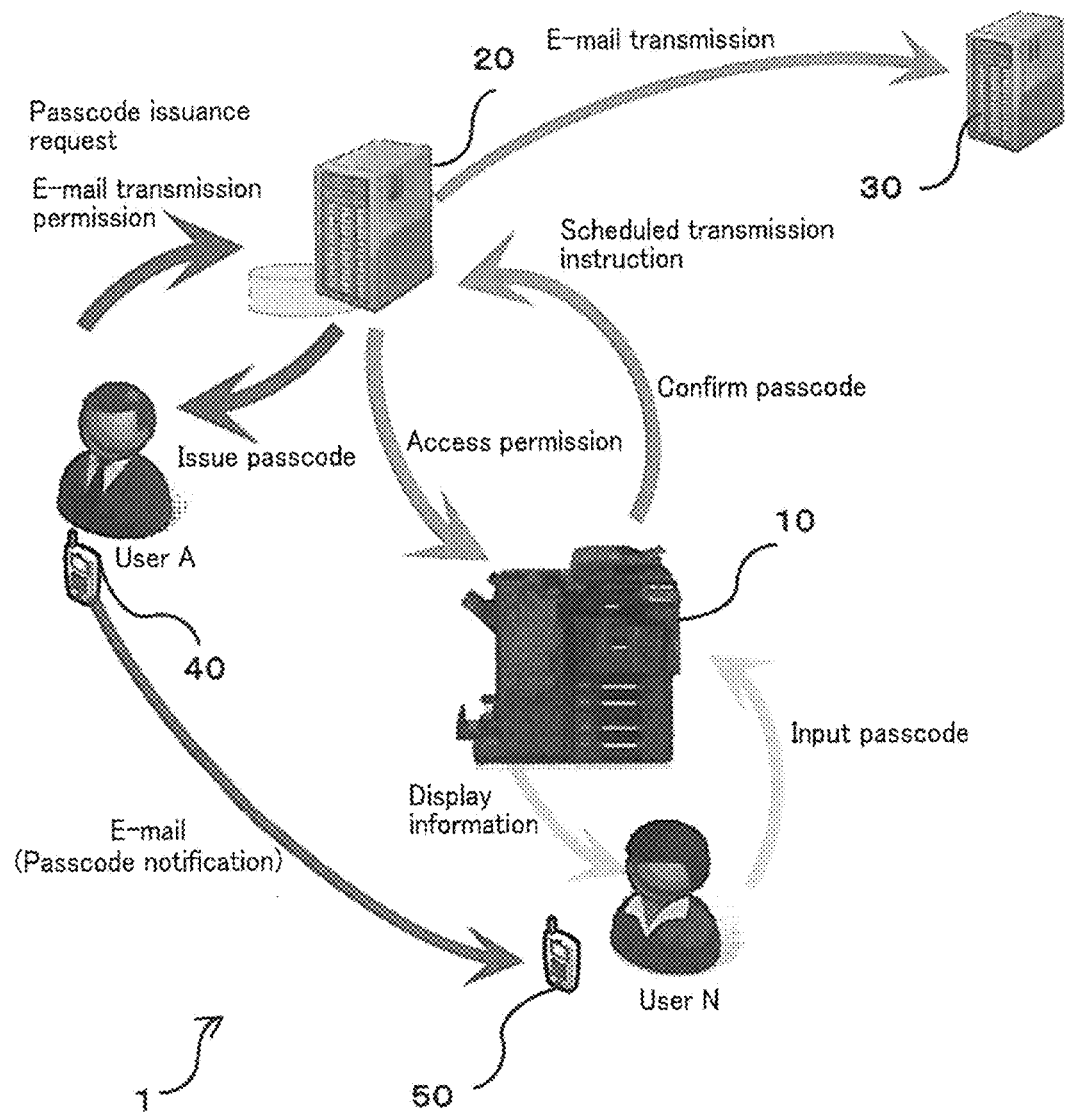
FIG. 1 shows an example of a structure of an image data transmission system to which an information management system according to an embodiment is applied.

FIG. 1 shows an example of a structure of an image data transmission system to which the information management system according to the present embodiment is applied.

As shown in FIG. 1, an image data transmission system 1 includes an image forming apparatus 10, an address book data management server (hereinafter, simply "management server") 20, and an e-mail server 30. The image forming apparatus 10, the management server 20, and the e-mail server 30 are connected via a communication network, such as the Internet.

Through cooperation between the image forming apparatus 10 and the management server 20, the image data transmission system 1 performs management of the display of the address book on the image forming apparatus 10 (hereinafter, simply "display management"). Through the display management, the image data transmission system 1 can ensure not to display the destination information that is included in the address book and that requires a usage right to a user not having the usage right, unless usage permission is given by the management server 20. In the present embodiment, the usage right is the right to check the existence of information and to use the information. Consequently, a user not having the usage right for given registration information is neither permitted to check the existence of the registration information nor to use the registration information.

In addition, the image data transmission system 1 transmits, by e-mail, image data that is document information stored in the image forming apparatus 10 based on the destination information displayed through the display management.

Figure 2:
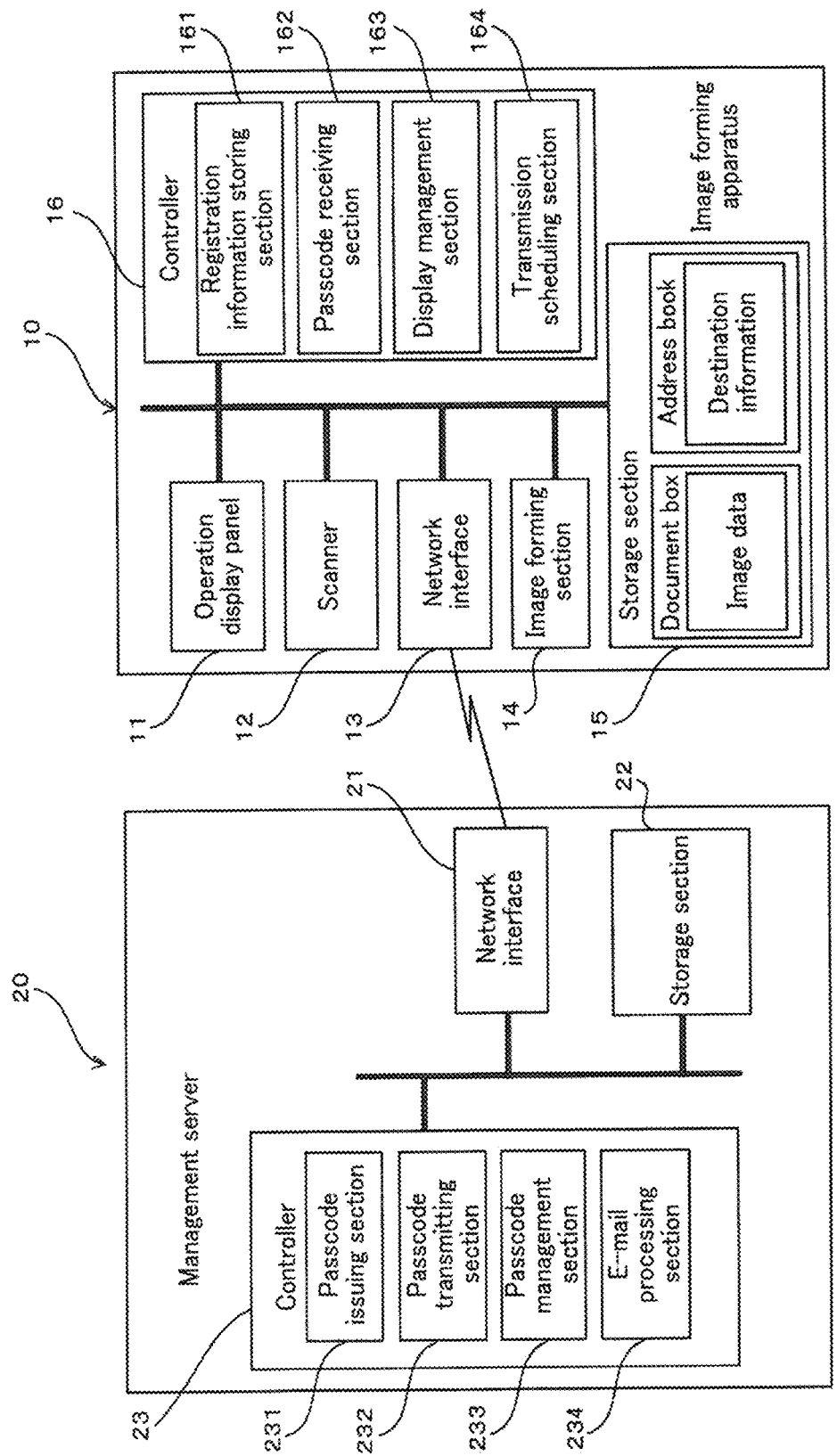
FIG. 2 shows an example of a structure of an image forming apparatus and a management server both included in the image data transmission system according to the present embodiment.

FIG. 2 shows an example of a structure of the image forming apparatus and the management server both included in the image data transmission system according to the present embodiment.

The image forming apparatus 10 is, for example, a digital multifunction peripheral and has a copy function, a print function, a scanner function, a facsimile function, an e-mail transmission function, a box function, and the like. The box function is to store inputted image data to a storage area called a document box.

The image forming apparatus 10 includes an operation display panel 11, a scanner 12, a network interface 13, an image forming section 14, a storage section 15, and a controller 16.

The operation display panel 11 receives various input operations to the image forming apparatus 10 and displays the results of processes or the like performed by the image forming apparatus 10. The operation display panel 11 includes a touch-sensitive liquid crystal display screen, for example.

The scanner 12 reads an image of an original document to generate image data.

The network interface 13 transmits data to and from external devices, such as the management server 20, via the communication network.

The image forming section 14 forms an image on paper based on, for example, the image data generated through reading by the scanner 12 or the image data (job) input from another device via the communication network.

The controller 16 is an arithmetic device, such as a central processing unit (CPU) or the like. The controller 16 performs various processes by executing a computer program (hereinafter, simply "program").

The storage section 15 includes a read-only memory (ROM) that stores programs, a random access memory (RAM) as a work area, and a hard disk drive (HDD) as a secondary storage section.

In the image forming apparatus 10 according to the present embodiment, the controller 16 executes a program stored in the storage section 15 to operate as a registration information storing section 161, a passcode receiving section 162 that is a permission information receiving section, a display management section 163 that is a registration information management section, and a transmission scheduling section 164.

The registration information storing section 161 implements the function of storing registration information. The registration information storing section 161 registers destination information that is registration information into the address book stored in the storage section 15 and manages the destination information. The destination information includes a destination name and an e-mail address that is a destination identifier. However, the destination identifier is not limited to an e-mail address and may be other information, such as a facsimile number. The destination information is generated based on, for example, user input on the image forming apparatus 10, a portable terminal 40 (see FIG. 1), or the like and registered into the address book.

In addition, the registration information storing section 161 registers image data (box document) that is registration information into the document box stored in the storage section 15 and manages the image data. The image data is input, for example, through a job executed when the copy function, the print function, the scanner function, or the facsimile function is used, and the input image data is registered into the document box by the box function.

The destination information in the address book and the image data in the document box are either right-requiring information or non-right-requiring information. The right-requiring information is accessible by a user having an access right that is the usage right (destination information or image data). The non-right-requiring information is such that all users have the access right and thus no usage right is required (destination information or image data).

The passcode receiving section 162 implements the function of receiving permission information. The passcode receiving section 162 receives input of a passcode that is usage permission information notified from a user having the access right (user A in the present embodiment) to a user not having the access right (user N in the present embodiment). The passcode is issued by the management server 20 in response to an issuance request from the user having the access right and for temporarily permitting the user not having the access right (user N) to access the right-requiring information within the scope of the access right of the user who made the issuance request.

The display management section 163 displays the destination information included in the address book or the image data included in the document box on the operation display panel 11. With respect to the non-right-requiring information, the display management section 163 fetches the non-right-requiring information from the storage section 15 to display the non-right-requiring information on the operation display panel 11 in response to an operation to the operation display panel 11. As a result, the non-right-requiring information can be checked for the existence and used by all the users.

With respect to the right-requiring information, a user having the access right logs on the image forming apparatus 10 through authentication. In response, the display management section 163 fetches the right-requiring information from the storage section 15 within the scope of the access right of the user having logged on and displays the right-requiring information on the operation display panel 11.

Therefore, normally, no user other than those having the access right can cause the right-requiring information to be displayed on the operation display panel 11 to check the existence of the right-requiring information.

The display management section 163 according to the present embodiment implements the function of enabling the usage. Even if the user does not have the access right (user N), the display management section 163 fetches the right-requiring information from the storage section 15 to display the right-requiring information on the operation display panel 11 based on a passcode received by the passcode receiving section 162.

More specifically, the image forming apparatus 10 transmits the received passcode to the management server 20 and in response receives an access permission notification (usage permission notification) from the management server 20. Based on the access permission notification received from the management server 20, the display management section 163 fetches the right-requiring information from the storage section 15 to display the right-requiring information on the operation display panel 11 of the image forming apparatus 10. As a result, the user not having the access right is enabled to check the existence of the right-requiring information and to use the right-requiring information (see FIG. 1).

The transmission scheduling section 164 implements the function of setting a scheduled transmission. The transmission scheduling section 164 receives a scheduled transmission instruction. The scheduled transmission instruction instructs to set a scheduled transmission of e-mail with an attachment of image data to the destination indicated by the destination information that is displayed based on the passcode. In the case where the destination information is right-requiring information, the transmission scheduling section 164 of the image forming apparatus 10 notifies the management server 20 (see FIG. 1) about the received scheduled transmission instruction. In the case where the destination information is non-right-requiring information, the transmission scheduling section 164 transmits via the mail server 30 e-mail according to the scheduled transmission instruction.

The management server 20 manages the address book usable by the image forming apparatus 10. The management server 20 includes a network interface 21, a storage section 22, and a controller 23, for example.

The network interface 21 transmits data to and from external devices, such as the image forming apparatus 10, via the communication network.

The controller 23 is an arithmetic device, such as a central processing unit (CPU) or the like. The controller 23 performs various processes by executing a program.

The storage section 22 includes a ROM that stores programs, a RAM as a work area, and a HDD as a secondary storage section.

In the management server 20 according to the present embodiment, the controller 23 executes a program stored in the storage section 22 to operate as a passcode issuing section 231 that is a permission information issuing section, a passcode transmitting section 232, a passcode management section 233 that is a permission information management section, and an e-mail processing section 234 that is both a transmission permission receiving section and a transmission executing section.

The passcode issuing section 231 implements the function of issuing permission information. The passcode issuing section 231 issues a passcode with a time limit in response to an issuance request from the user having the access right (user A).

The issuance request for the passcode is made via, for example, the portable terminal 40 (see FIG. 1) owned by the user A having the access right. The portable terminal 40 is a portable information processing terminal, such as a multifunctional phone or the like, for example. For example, upon receipt of input of user information, such as a user ID or the like, form the user A, a specific application on the portable terminal 40 transmits an issuance request for a passcode to the management server 20.

The passcode transmitting section 232 transmits the issued passcode to the user who made the issuance request (user A). Although not specifically limited, the passcode is transmitted via, for example, an application on the portable terminal 40.

The passcode management section 233 implements the function of managing permission information. The passcode management section 233 stores into the storage section 22 the issued passcode in association with the user who made the issuance request, more specifically with the user information of the user, and manages the passcode. The passcode management section 233 deletes a passcode having been expired from the storage section 22.

In addition, upon receipt of a passcode from the image forming apparatus 10, the passcode management section 233 searches to fetch the user information associated with the received passcode. The passcode management section 233 transmits the access permission notification that is based on the fetched user information to the image forming apparatus 10. The fetched user information (user ID or the like) is included in the access permission notification. The display management section 163 of the image forming apparatus 10 displays the right-requiring information within the scope of the access right associated with the user ID or the like included in the access permission notification.

The e-mail processing section 234 implements the function of receiving transmission permission. Upon receipt of the notification of the scheduled transmission instruction from the image forming apparatus 10, the e-mail processing section 234 receives the transmission permission for e-mail form the user who made the issuance request for the passcode (user A). The transmission permission is received via, for example, an application on the portable terminal 40.

The e-mail processing section 234 implements the function of executing the transmission. On receiving the transmission permission, the e-mail processing section 234 transmits e-mail via the e-mail server 30 according to the scheduled transmission instruction.

Figure 3:
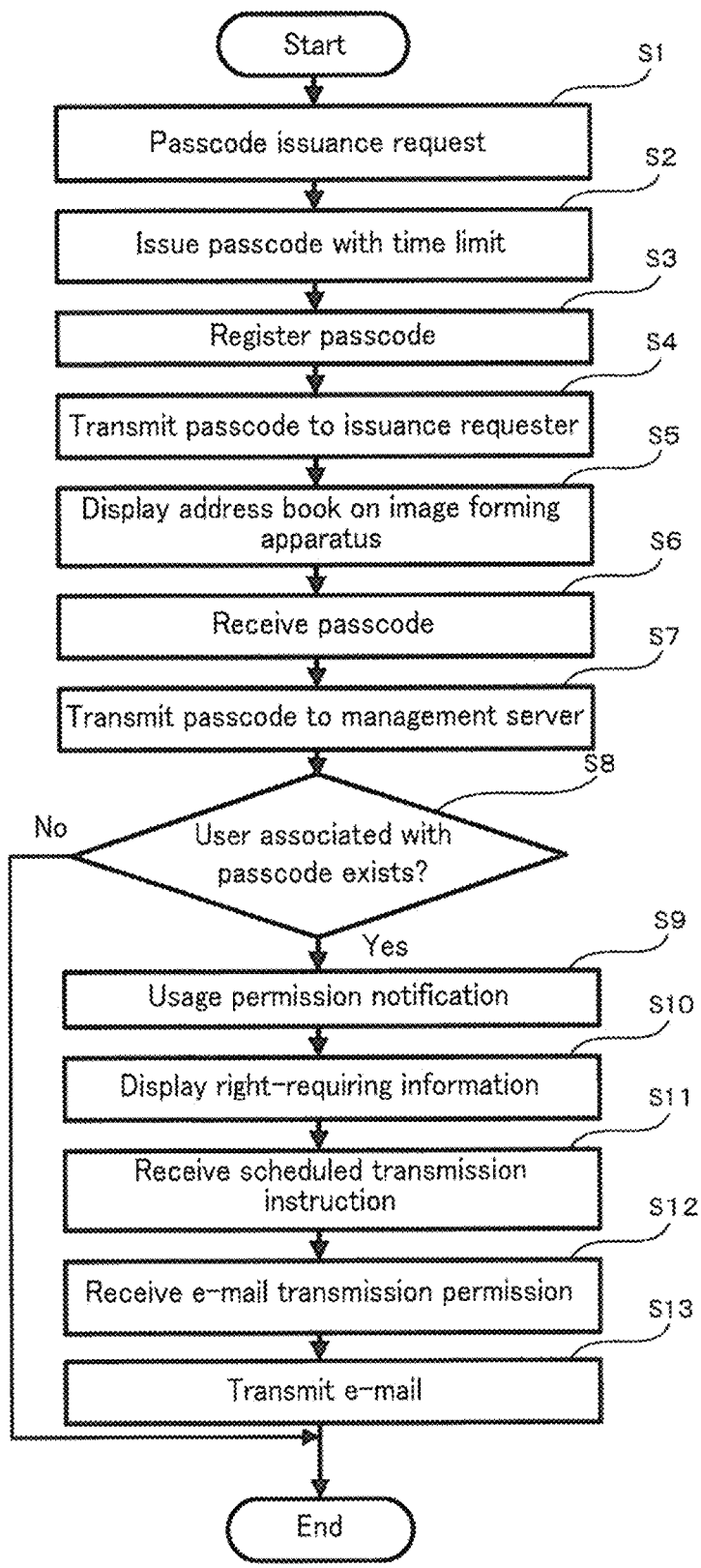
FIG. 3 shows a flowchart of a registration information management process by the image data transmission system according to the present embodiment.

FIG. 3 shows a flowchart of a registration information management process (image data transmission process) by the image data transmission system according to the present embodiment.

The following describes the image data transmission process according to the present embodiment by way of an example in which the user A who is out of the office requests the user N who is in the office but does not have the access right to transmit e-mail to the destination X with an attachment of image data X that is stored in the document box. Note that both the destination information of the destination X and the image data X are right-requiring information and that can be accessed by the user A having the access right after authentication.

First, in Step S1 of the image data transmission process, an issuance request for a passcode is transmitted from the portable terminal 40 of the user A to the management server 20. More specifically, an application on the portable terminal 40 is operated by the user A to transmit an issuance request for a passcode to the management server 20. Then, the process moves to Step S2.

In Step S2, a passcode is issued with a time limit. More specifically, the passcode issuing section 231 of the management server 20 issues a passcode with a time limit. Then, the process moves to Step S3.

In Step S3, the passcode is registered. More specifically, the passcode management section 233 of the management server 20 stores the passcode issued in Step S2 in the storage section 22 in association with the user information of the user A who made the issuance request. Then, the process moves to Step S4.

In Step S4, the passcode is transmitted to the source of the issuance request. More specifically, the passcode transmitting section 232 of the management server 20 transmits the passcode to the portable terminal 40 of the user A who made the issuance request.

Here, after receiving the passcode and in response to the operation by the user A, the portable terminal 40 of the user A transmits e-mail containing the received passcode to a portable terminal 50 of the user N (see FIG. 1) who is in the office. As a consequence, the received passcode is notified. Together with the notification of the passcode, work that involves use of the right-requiring information is requested. In the present embodiment, the work that is to send e-mail to the destination X with an attachment of the image data X is requested to the user N. Similarly to the portable terminal 40, the portable terminal 50 of the user N is a portable information processing terminal, such as a multi-functional phone or the like, for example. Then, the process moves to Step S5.

In Step S5, the image forming apparatus 10 displays the address book. More specifically, the image forming apparatus 10 first receives, on the operation display panel 11, an operation that instructs to display the address book (hereinafter, "address book display operation") from the user N.

After the image forming apparatus 10 receives the address book display operation from the user N, the display management section 163 fetches from the address book in the storage section 15 the destination information for which the user N has the access right and displays the destination information on the operation display panel 11. In the present embodiment, the user N does not have the access right for the destination information of the destination X. Consequently, in Step S5, the destination information of the destination X is not displayed on the operation display panel 11 of the image forming apparatus 10. Therefore, at this stage, the user N is able to neither check the existence of the destination information of the destination X nor to use the destination information of the destination X. The process then moves to Step S6.

In Step S6, the passcode is received. More specifically, the passcode receiving section 162 of the image forming apparatus 10 receives input of the passcode on the operation display panel 11 from the user N. Then, the process moves to Step S7.

In Step S7, the passcode is transmitted to the management server 20. More specifically, the display management section 163 of the image forming apparatus 10 transmits the passcode received in Step S6 to the management server 20. The process then moves to Step S8.

In Step S8, it is determined whether or not user information associated with the passcode exists. More specifically, the passcode management section 233 of the management server 20 searches the storage section 22 for user information that is associated with the passcode received from the image forming apparatus 10.

If the user information associated with the passcode is found (Step S8: Yes), the process moves to Step S9. On the other hand, if user information associated with the passcode is not found (Step S8: No), the process ends. In the present embodiment, the user information of the user A is found and fetched as the user information associated with the passcode.

In Step S9, usage permission is notified. More specifically, the passcode management section 233 of the management server 20 transmits an access permission notification regarding the user indicated by the fetched user information, in other words, regarding the user A, to the image forming apparatus 10. The process then moves onto Step S10.

In Step S10, the right-requiring information is displayed. More specifically, the display management section 163 of the image forming apparatus 10 fetches from the storage section 15 the destination information that is the right-requiring information for which the user corresponding to the received access permission notification, in other words, the user A, has the access right and displays the destination information on the operation display panel 11.

Figure 4:
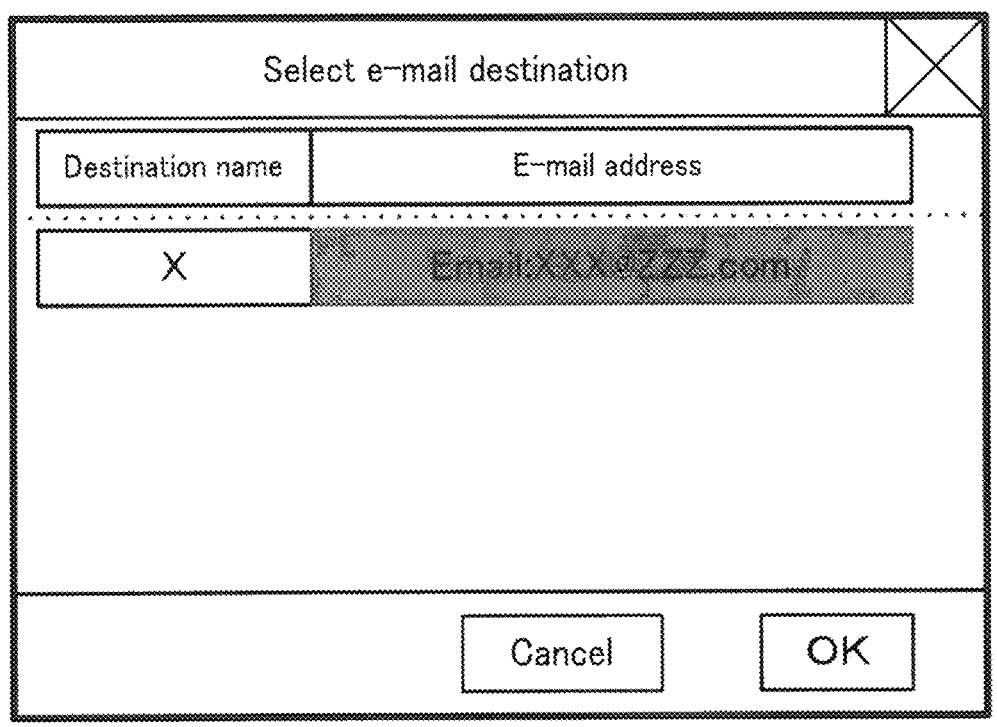
FIG. 4 shows an example of a destination display screen displayed by the image data transmission system according to the present embodiment.

At this time, the display management section 163 displays the destination information with the e-mail address hidden. FIG. 4 shows an example of a destination display screen on which destination information is displayed. In FIG. 4, the e-mail address of the destination information regarding the destination X is displayed in a shaded area. In practice, however, the e-mail address is hidden on display and thus not visible to the user.

The destination information displayed in Step S10 is within the scope of the access right of the user A who made the issuance request for the passcode. In the manner described above, the user N having received the notification of the passcode is enabled to check the existence of the destination information and to use the destination information that is within the access right of the user A who made the issuance request for the passcode. The same holds with respect to image data in the document box stored in the storage section 15 (image data by the box function). More specifically, the user N having received the notification of the passcode is enabled to check the existence of the image data by the box function and to use the image data that is within the access right of the user A who made the issuance request for the passcode. The process then moves onto Step S11.

In Step S11, a scheduled transmission instruction is received. More specifically, the transmission scheduling section 164 of the image forming apparatus 10 receives, from the user N, a scheduled transmission instruction that instructs to set a scheduled transmission of the image data X by e-mail to the destination X. Here, based on the passcode, the user N is permitted to access the destination information of the destination X and the image data X. The scheduled transmission instruction received by the transmission scheduling section 164 is transmitted to the management server 20.

The scheduled transmission instruction is received in the following manner, for example. That is, on the destination display screen shown in FIG. 4, the user N selects the destination X and the image data X in the document box. Then, with a click of the OK button on the destination display screen by the user N, the transmission scheduling section 164 receives a scheduled transmission instruction that instructs to set a scheduled transmission of the image data X by e-mail to the destination X. The process then moves onto Step S12.

In Step S12, permission for the e-mail transmission is received. More specifically, the e-mail processing section 234 of the management server 20 receives, from the user A, permission to transmit e-mail (hereinafter, "e-mail transmission permission") according to the scheduled transmission instruction received from the image forming apparatus 10. On receiving the e-mail transmission permission, the e-mail processing section 234 notifies the user A by transmitting, to the portable terminal 40 of the user A, information including the destination and image data from among the details of the scheduled transmission instruction. As a result, the user A can confirm the details of the work requested to the user N. The process then moves onto Step S13.

In Step S13, e-mail is transmitted. More specifically, on receiving the e-mail transmission permission from the user A, the e-mail processing section 234 of the management server 20 transmits e-mail via the mail server 30 according to the scheduled transmission instruction.

The information management system according to the present embodiment includes the registration information storing section 161, the passcode receiving section 162 (the permission information receiving section), and the display management section 163 (the registration information management section). The registration information storing section 161 stores registration information (destination information or image data) for which a first user has the access right (the usage right) to check the existence of the registration information and to use the registration information. The passcode receiving section 162 receives input of a passcode from a second user not having the access right for the registration information. The passcode is notified from the first user to the second user and for temporarily permitting the second user to check the existence of the registration information and to use the registration information. Based on the passcode received by the passcode receiving section 162 from the second user, the display management section 163 enables the second user to check the existence of the registration information and to use the registration information.

The above structure ensures that the existence of registration information (the right-requiring information) that requires an access right cannot be checked by any user not having the access right, unless he or she knows the passcode. This prevents the registration information from being leaked to users not having the access right.

The information management system according to the present embodiment further includes the passcode issuing section 231 and the passcode management section 233. In response to an issuance request received from the first user, the passcode issuing section 231 issues a passcode to the first user. The passcode management section 233 manages the passcode in association with the first user. In addition, the display management section 163 (the registration information management section) of the image forming apparatus 10 enables the second user to check the existence of the right-requiring information and to use the right-requiring information within the scope of the access right of the first user associated with the passcode received by the passcode receiving section 162.

With the structure described above, the information management system according to the present embodiment can easily enable a user not having the access right to check the existence of the right-requiring information and to use the right-requiring information in response to a request from a user having the access right, while preventing leakage of the right-requiring information.

According to the present embodiment, the right-requiring information includes destination information that includes a destination name and an e-mail address that is a destination identifier. In addition, the registration information management section (the display management section 163) displays the destination information with the destination identifier hidden.

With the structure described above, the information management system according to the present embodiment can enable a user not having the access right to check and to use the destination name that is the minimum information necessary, in the case where the right-requiring information is the destination information. Therefore, leakage of the right-requiring information can be prevented more reliably.

The information management system according to the present embodiment further includes the transmission scheduling section 164 and the e-mail processing section 234 (the transmission permission receiving section and the transmission executing section). The transmission scheduling section 164 receives, from the second user, a scheduled transmission instruction that instructs to set a scheduled transmission of e-mail to the destination indicated by the destination information displayed based on the passcode. Upon receipt of the scheduled transmission instruction, the e-mail processing section 234 receives transmission permission from the first user that is associated with the passcode. Based on the transmission permission, the e-mail processing section 234 transmits e-mail according to the scheduled transmission instruction.

With the structure described above, before transmitting e-mail to the destination indicated by the destination information that is the right-requiring information, the information management system according to the present embodiment can enable the user who made the passcode issuance request to check the details of the e-mail. As a consequence, erroneous e-mail transmission can be prevented, leading to prevention of leakage of the right-requiring information to unintended destinations.

Up to this point, an embodiment of the present disclosure has been described. However, the present disclosure is not limited to such and various modifications are possible.

According to the embodiment described above, the address book and the document box are managed by the image forming apparatus 10. However, either or both the address book and the document box may be managed by the management server 20.

What is claimed is:

1. An information management system comprising:
a management server that communicates with a first terminal used by a first user; and
an image forming apparatus that communicates with the management server and also communicates with a second terminal used by a second user, the first terminal being communicable with the second terminal, wherein
a processor of the image forming apparatus includes:

a registration information storing section that stores registration information for which the first user has a usage right to check existence of the registration information and to use the registration information after the first user logs on to the image forming apparatus through authentication;

a permission information receiving section that receives a passcode with a time limit from the second user, the passcode being usage permission information that is notified from the first user to the second user not having the usage right for the registration information and for temporarily permitting the second user to check the existence of the registration information and to use the registration information; and a registration information management section that enables, based on the passcode received by the permission information receiving section from the second user, the second user to check the existence of the registration information and to use the registration information, and a processor of the management server includes:

a permission information issuing section that issues the passcode to the first user in response to an issuance request received from the first terminal; and a permission information management section that manages the passcode in association with the first user, the management server issues the passcode to the first user by transmitting the passcode to the first terminal, the passcode issued to the first user is notified from the first user to the second user by the first user transmitting the passcode from the first terminal to the second terminal, the registration information includes destination information that includes a destination name and a destination identifier, the processor of the image forming apparatus further includes a transmission scheduling section that receives from the second user a scheduled transmission instruction instructing to set a scheduled transmission of e-mail to a destination indicated by the destination information displayed based on the passcode and that transmits the scheduled transmission instruction to the management server, and the processor of the management server further includes:

a transmission permission receiving section that receives, upon receipt of the scheduled transmission instruction transmitted from the transmission scheduling section, transmission permission from the first terminal that is associated with the passcode; and a transmission executing section that transmits, based on the transmission permission, e-mail according to the scheduled transmission instruction.

2. An information management system according to claim 1, wherein the image forming apparatus further includes a display section, and the registration information management section displays the registration information on the display section.

3. An information management system according to claim 2, wherein the image forming apparatus further includes a storage section, and in response to an operation made by the second user to instruct to display an address book stored in the storage section, the registration information management section fetches, from the address book, the destination information for which the second user has an access right and displays the destination information with the destination identifier hidden.

4. An information management system according to claim 1, wherein the image forming apparatus further includes a display section and a storage section, the registration information management section displays the registration information on the display section, and in response to an operation made by the second user to instruct to display an address book stored in the storage section, the registration information management section fetches, from the address book, destination information for which the second user has an access right and displays the destination information with the destination identifier hidden.

5. An information management method used in an information management system, the information management system including a management server that communicates with a first terminal used by a first user, and an image forming apparatus that communicates with the management server and also communicates with a second terminal used by a second user, the first terminal being communicable with the second terminal, a processor of the image forming apparatus including a registration information storing section, a permission information receiving section, a registration information management section, and a transmission scheduling section, a processor of the management server including a permission information issuing section, a permission information management section, a transmission permission receiving section, and a transmission executing section, the method comprising:

the registration information storing section storing registration information for which the first user has a usage right to check existence of the registration information and to use the registration information after the first user logs on to the image forming apparatus through authentication;

the permission information receiving section receiving a passcode with a time limit from second user, the passcode being usage permission information that is notified from the first user to the second user not having the usage right for the registration information and for temporarily permitting the second user to check the existence of the registration information and to use the registration information;

the registration information management section enabling, based on the passcode received from the second user, the second user to check the existence of the registration information and to use the registration information;

the permission information issuing section issuing the passcode to the first user in response to an issuance request received from the first terminal; and the permission information management section managing the passcode in association with the first user, wherein the management server issues the passcode to the first user by transmitting the passcode to the first terminal, the passcode issued to the first user is notified from the first user to the second user by the first user transmitting the passcode from the first terminal to the second terminal, the registration information includes destination information that includes a destination name and a destination identifier, the transmission scheduling section receives from the second user a scheduled transmission instruction instructing to set a scheduled transmission of e-mail to a destination indicated by the destination information displayed based on the passcode and transmits the scheduled transmission instruction to the management server;

the transmission permission receiving section receives, upon receipt of the scheduled transmission instruction transmitted from the transmission scheduling section, transmission permission from the first terminal that is associated with the passcode; and the transmission executing section transmits, based on the transmission permission, e-mail according to the scheduled transmission instruction.

6. An information management system comprising:

a management server that communicates with a first terminal used by a first user; and an image forming apparatus that communicates with the management server and also communicates with a second terminal used by a second user, the first terminal being communicable with the second terminal, wherein a processor of the image forming apparatus includes:
- a registration information storing section that stores registration information for which the first user has a usage right to check existence of the registration information and to use the registration information after the first user logs on to the image forming apparatus through authentication;
- a permission information receiving section that receives a passcode with a time limit from second user, the passcode being usage permission information that is notified from the first user to the second user not having the usage right for the registration information and for temporarily permitting the second user to check the existence of the registration information and to use the registration information; and
- a registration information management section that enables, based on the passcode received by the permission information receiving section from the second user, the second user to check the existence of the registration information and to use the registration information, and the image forming apparatus further includes a display section and a storage section, and the registration information management section displays the registration information on the display section, the registration information includes destination information that includes a destination name and a destination identifier, in response to an operation made by the second user to instruct to display an address book stored in the storage section, the registration information management section fetches, from the address book, the destination information for which the second user has an access right and displays the destination information with the destination identifier hidden, the processor of the image forming apparatus further includes a transmission scheduling section that receives from the second user a scheduled transmission instruction instructing to set a scheduled transmission of e-mail to a destination indicated by the destination information displayed based on the passcode and that transmits the scheduled transmission instruction to the management server, and the processor of the management server further includes:
- a transmission permission receiving section that receives, upon receipt of the scheduled transmission instruction transmitted from the transmission scheduling section, transmission permission from the first terminal that is associated with the passcode; and
- a transmission executing section that transmits, based on the transmission permission, e-mail according to the scheduled transmission instruction.

* * * * *